United States Patent [19]

Hutchinson

[11] Patent Number: 5,341,271
[45] Date of Patent: Aug. 23, 1994

[54] SURGE ARRESTER FAULT INDICATOR

[75] Inventor: Ted F. Hutchinson, Cedar Park, Tex.

[73] Assignee: Minnesota Mining and Manufacturing Company, St. Paul, Minn.

[21] Appl. No.: 901,895

[22] Filed: Jun. 22, 1992

[51] Int. Cl.5 .............................. H02H 9/04
[52] U.S. Cl. .................... 361/123; 361/117; 361/120; 340/647; 340/650
[58] Field of Search ............ 361/117, 118, 123, 125, 361/120; 340/647, 650; 337/30

[56] References Cited

U.S. PATENT DOCUMENTS

| | | | |
|---|---|---|---|
| 3,869,650 | 5/1973 | Cunningham et al. | 317/61 |
| 4,471,402 | 9/1984 | Cunningham | 361/125 |
| 4,710,847 | 6/1986 | Kortschinski et al. | 361/125 |
| 4,788,622 | 7/1987 | Cinquin | 361/124 |
| 5,237,482 | 8/1993 | Osterhout et al. | 361/117 |

*Primary Examiner*—A. D. Pellinen
*Assistant Examiner*—Sally C. Medley
*Attorney, Agent, or Firm*—Gary L. Griswold; Walter N. Kirn; David W. Anderson

[57] ABSTRACT

A fault indicator for a surge arrester includes an explosive cartridge which is detonated by a fault condition of an attached surge arrester to remove a covering which exposes colored, reflective tape to provide a visual indication of the faulted condition of the surge arrester.

10 Claims, 3 Drawing Sheets

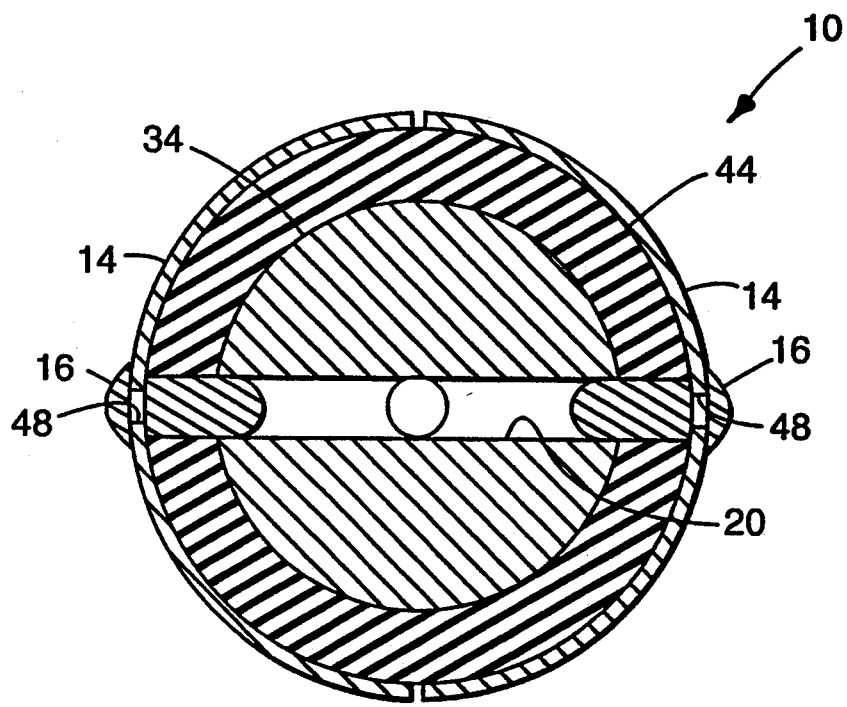
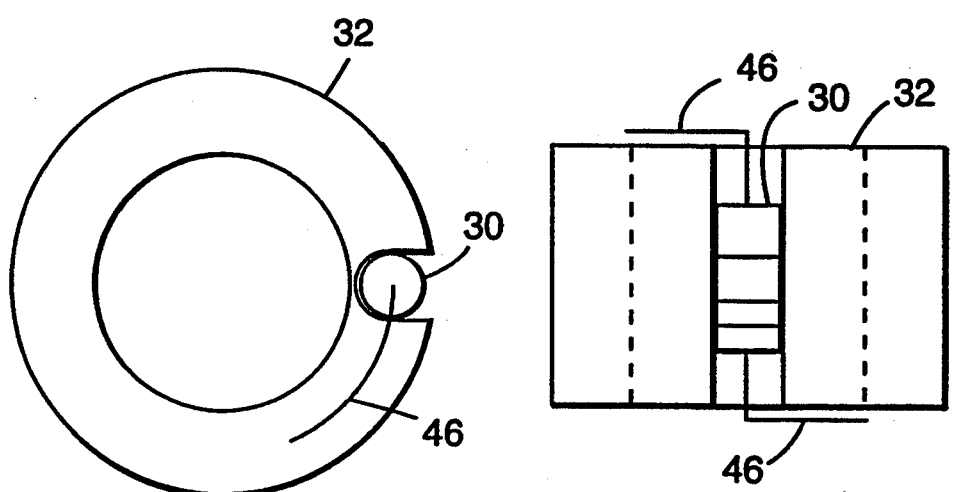

SURGE ARRESTER FAULT INDICATOR

FIELD OF THE INVENTION

The present invention relates generally to electrical power transmission and, in particular, a fault indicator to indicate the failure of a surge arrester attached to a power transmission line.

BACKGROUND OF THE INVENTION

The present invention is directed to a fault indicator for a surge arrester. The function of a surge arrester is to protect a power transmission system from overvoltage surges which are typically caused by lightning, switching transients or faults. A typical surge places a high current overvoltage on the power transmission line capable of destroying any equipment which is connected to the power line. Such equipment might be transformers, terminations, underground cables or splices.

To protect this expensive equipment, a surge arrester is placed on the power transmission line near the equipment to be protected. The arrester normally acts as an insulator, allowing essentially no current to pass through it, but an overvoltage on the line will cause the arrester to become conductive. In the conductive state, the arrester will pass the high current surge directly to ground and allow only a small kilovolt surge to continue down the power transmission line. The equipment the arrester is installed to protect is designed to withstand kilovolt surges and so is capable of maintaining its functionality despite exposure to such a surge.

After passage of the overvoltage surge, the surge arrester is designed to return to its non-conductive state and is ready for the next instance of an overvoltage surge. However, it is possible that the magnitude of the overvoltage surge may be such that the surge arrester fails, in which case the surge arrester continues to conduct current even after passage of the surge. Failure of the surge arrester may also be caused by moisture ingress into the surge arrester or contamination of the exterior of the arrester.

The fault indicator of the present invention is designed to provide a visual indication of surge arrester failure so that the faulty surge arrester can be easily identified and appropriate action taken.

A fault indicator must meet three requirements. First, the fault indicator must not alter the behavior characteristics of the surge arrester to which it is attached. Second, if the attached arrester fails, the fault indicator must give a visual signal which is preferably detectable day or night from at least thirty meters. Third, the fault indicator must have the capability of maintaining a phase to ground fault through the faulted surge arrester without failing itself.

SUMMARY OF THE INVENTION

According to the present invention, a fault indicator meeting the above criteria includes a first indicator half having a protrusion for focusing an electrical arc, a second indicator half having a conductive explosive cartridge for producing pressurized gas in response to the application of heat produced by the electrical arc to the cartridge, the first and second indicator halves being in alignment such that the electrical arc is focused on the cartridge, a gas vent passageway extending from the explosive cartridge to and communicating with the exterior of the second indicator half and means disposed in the gas vent passageway and responsive to the pressurized gas for producing a signal that the electrical arc has been created and said pressurized gas has been produced.

In the preferred embodiment of the invention, the fault indicator also includes a resistor connecting the first and the second indicator halves to permit the flow of a small leakage current between the indicator halves during normal operation. It is also preferred that the means for producing the signal include a shield covering at least the portion of the second indicator half, a plug extending into the gas vent passageway and retaining the shield relative to the second indicator half, whereby the cartridge is responsive to the creation of an electrical arc such that the cartridge explosively creates gas at a pressure and with a volume sufficient to expel the plug from the passageway and thereby remove the shield from the second indicator half to provide a visual indication that the cartridge has exploded. The shield may be formed of a single piece, in which case one gas vent passageway and plug needs to be provided, or two pieces, in which case gas vent passageways will extend to opposite sides of the fault indicator and two plugs will be provided, one for each of the two shield pieces. In another embodiment, the means for producing the signal may be a flag attached to the fault arrester which is retained in one position by a lever extending into the gas vent passageway. The production of pressurized gas by the cartridge in response to the arc moves the lever and releases the flag to provide an indication that a faulted condition of the surge arrester exists.

BRIEF DESCRIPTION OF THE DRAWINGS

The present invention will be more thoroughly described with reference to the accompanying drawings, wherein like numbers refer to like parts in the several views, and wherein:

FIG. 4 is a transverse cross-sectional view of the fault indicator of the present invention taken generally along the lines 4—4 of FIG. 3;

FIG. 5 is a plan view of interior parts of the fault indicator;

FIG. 6 is an elevational view of the interior part of FIG. 5;

DESCRIPTION OF THE PREFERRED EMBODIMENTS

Figure 1:
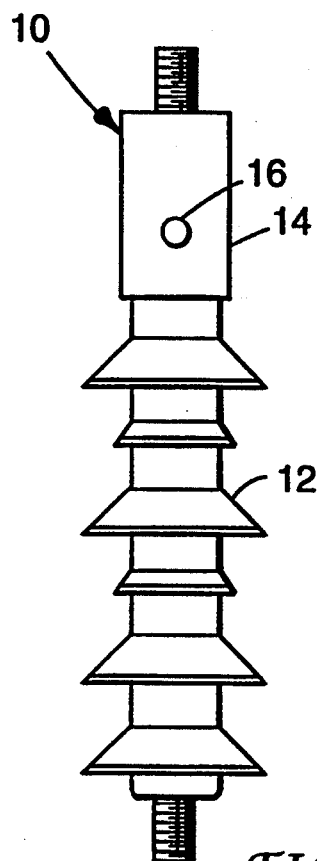
FIG. 1 is an elevational view of a surge arrester with a fault indicator of the present invention attached, the fault indicator being illustrated prior to a faulted condition of the surge arrester.

FIG. 1 illustrates a fault indicator according to the present invention and generally indicated as 10, mounted on a surge arrester 12. The surge arrester 12 is typically mounted between a power transmission line and ground. The fault indicator 10 may be mounted either between the surge arrester 12 and the power transmission line or the surge arrester and ground. FIG. 1 illustrates the fault indicator 10 in a normal operating condition, i.e., when the surge arrester 12 is operating normally. In this condition, the outer surface of the indicator 10 is covered by a shield 14, preferably gray in color, held in place by a plug 16.

Figure 2:
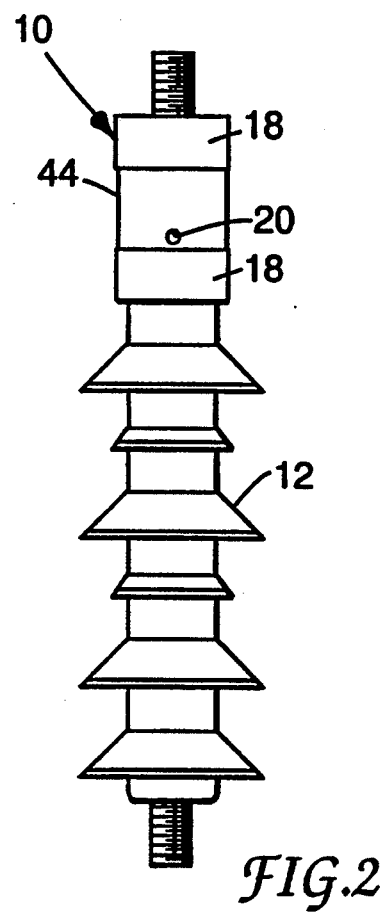
FIG. 2 is an elevational view of the surge arrester and fault indicator combination similar to FIG. 1, with the fault indicator illustrated as it would appear after the surge arrester has become faulted.

FIG. 2 is an illustration of the fault indicator 10 as it appears when the surge arrester 12 is in a faulted condition. The shield 14 and the plug 16 have been forcefully expelled from the fault indicator 10, exposing two bands 18 of reflective tape in a color, preferably red, which contrasts with the color of the fault indicator 10 body. FIG. 2 also indicates a gas vent passageway 20 into which the plug 16 was inserted.

Figure 3:
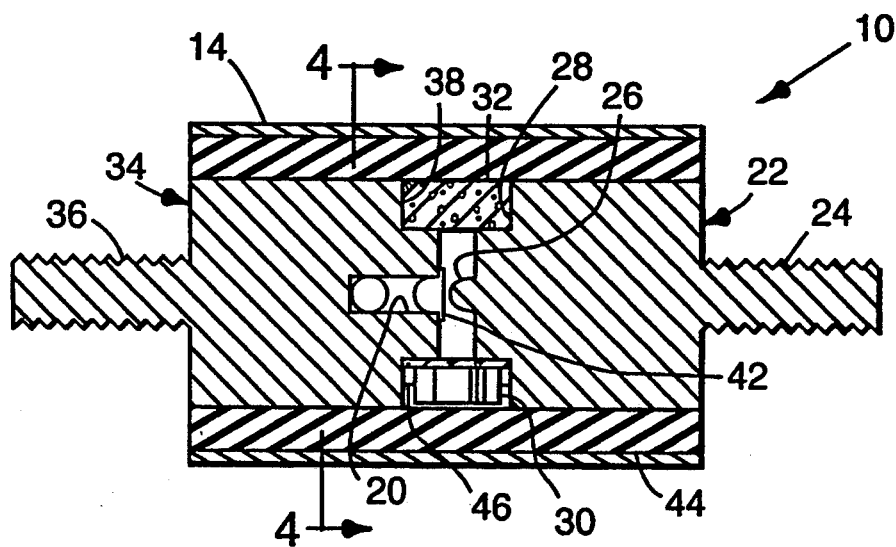
FIG. 3 is a longitudinal cross-sectional illustration of the fault indicator of the present invention.

FIG. 3 illustrates the fault indicator 10 in longitudinal cross-section, with the indicator 10 including a first indicator half 22 which is a cylindrical, electrically conductive piece, preferably of stainless steel, which includes a threaded stud 24 for attachment of the fault indicator 10 to the surge arrester 12 or a power transmission line, a protrusion 26 for focusing an electrical arc which may be created within the fault indicator and a reduced-radius shoulder 28 provided to accommodate a resistor 30 and an annulus of foam 32 which supports the resistor 30.

Aligned with the first indicator half 22 is a second indicator half 34 which is likewise cylindrical in shape and manufactured from an electrically conductive material, again preferably stainless steel. The second indicator half 34, like the first indicator half 22, includes a threaded stud 36 for attachment of the fault indicator 10 to the surge arrester 12 or a power transmission line and a reduced-radius shoulder 38 to accommodate the resistor 30 and the foam annulus 32. Aligned with the protrusion 26 is the gas vent passageway 20 into which is inserted a conductive, explosive cartridge 42. The cartridge 42 is any device capable of producing a volume of pressurized gas when heated and is preferably a blank pistol cartridge of the type used in starter guns.

The first indicator half 22 and the second indicator half 34 are held in alignment by a tubular housing 44 of an electrically insulated material, preferably fiberglass, which is positively attached to the indicator halves 22 and 34 in any convenient manner. The attachment means may be pins inserted into holes drilled through the housing 44 and into the indicator halves 22 and 34.

FIG. 4 illustrates the fault indicator 10 in transverse cross-section and shows the gas vent passageway 20, plugs 16 and shield 14 in greater detail. The gas vent passageway 20 extends transversely from the center of the second indicator half 34 to communicate with opposite sides of the second indicator half 34. The shield 14 is formed of two pieces of any polymeric material which is suitable for outdoor use. The shield 14 is preferably non-reflective and colored a neutral color, preferably gray, to provide contrast with the reflective tape 18. Each half of the shield 14 includes a hole 48 through which is inserted the plug 16. The plug 16 is any resilient, elastomeric material, preferably rubber, which is suitable for outdoor use. The plug 16 is sized to frictionally engage the gas vent passageway 20 and thus frictionally retain the shield 14 when forced into the passageway 20.

FIGS. 5 and 6 illustrates the arrangement of the resistor 30 and the foam annulus 32 which supports the resistor 30 between the indicator halves 22 and 34. As illustrated, the leads 46 of the resistor 30 are formed to overlie the foam annulus 32 and thus contact and make an electrical connection through the resistor 30 between the first and second indicator halves 22 and 34.

In operation, the fault indicator 10 is connected between the surge arrester 12 and the power transmission line or the surge arrester 12 and ground. At normal transmission line voltages, the surge arrester 12 conducts a very minute current, in the microampere range, which is conducted between the indicator halves 22 and 34 by the resistor 30 to prevent a built-up of voltage between the two indicator halves 22 and 34. When an overvoltage surge is present on the power transmission line, the surge arrester momentarily becomes conductive and the voltage between the protrusion 26 and the cartridge 42 rapidly rises until an electrical arc is formed between the protrusion 26 and the cartridge 42. The electrical arc is formed at this location because the protrusion 26 is shaped to focus the arc on the cartridge 42. The protrusion 26 is preferably frusto-conical in shape. However, because the overvoltage surge is short in duration, the electrical arc struck between the protrusion 26 and the cartridge 42 is not of sufficient duration to create enough heat to detonate the cartridge 42. When the overvoltage surge passes, the surge arrester 12 returns to a non-conductive state and the electrical arc between the protrusion 26 and the cartridge 42 is extinguished.

If, however, the surge arrester 12 is faulted, the surge arrester 12 will continue to conduct and the electrical arc between the protrusion 26 and the cartridge 42 will not be extinguished and the cartridge 42 will continue to be heated. Increasing temperature of the cartridge 42 will eventually cause it to detonate, creating a quantity of pressurized gas within the gas vent passageway 20. This gas will force the rubber plugs 16 from the passageway 20 and allow the shield 14 to fall away from the body of the fault indicator 10. Removal of the shield 14 will expose the reflective tape 18 and provide a visual indication that the surge arrester 12 has been faulted.

Figure 7:
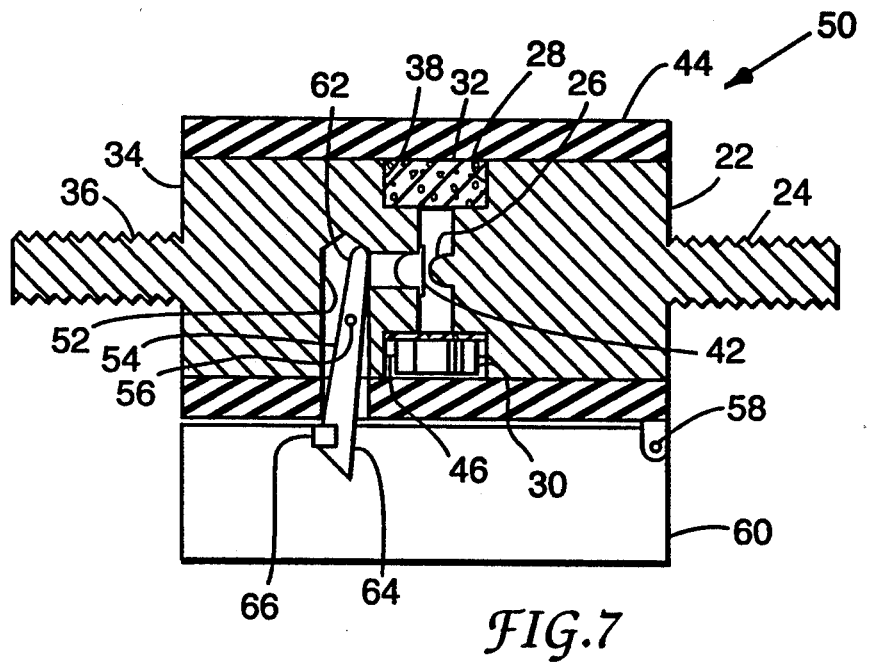
FIG. 7 is a longitudinal cross-sectional view of an alternate embodiment of the present invention prior to a faulted condition of the surge arrester.

FIG. 7 illustrates a second embodiment of a fault indicator according to the invention, and generally indicated as 50, which includes a different method of providing a visual indication that the surge arrester 12 has been faulted. In this embodiment, a larger gas vent passageway 52 is provided, into which is mounted a lever 54 by means of a pin 56 which allows the lever 54 to pivot. Pivotally mounted on the exterior of the fault indicator 50 by means of a hinge 58 is a flag 60. In the normal operating position shown in FIG. 7, a first end 62 of the lever 54 covers the portion of the gas vent passageway 20 extending directly from the cartridge 42 and a hooked, second end 64 of the lever 54 engages a protrusion 66 extending from the flag 60 to retain the free end of the flag 60 adjacent the fault arrester 50.

Figure 8:
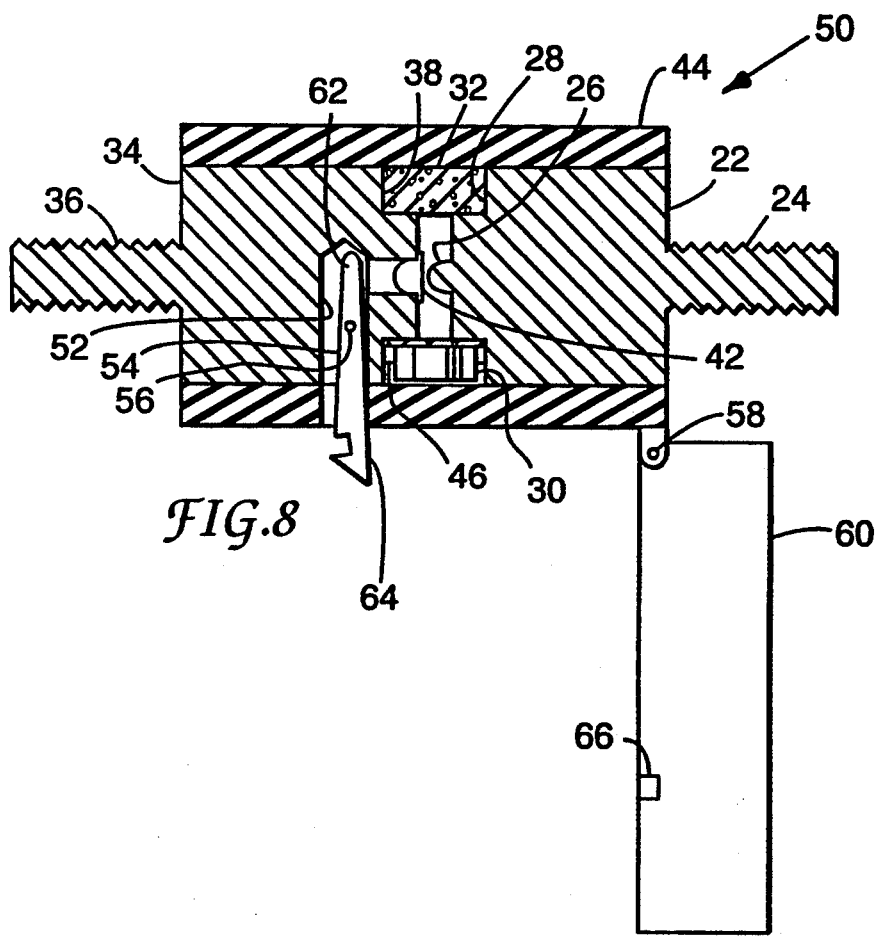
FIG. 8 is a view similar to that of FIG. 7, with the alternate fault indicator shown after a faulted condition of the surge arrester.

When a faulted condition of the surge arrester 12 is present, the cartridge 42 produces pressurized gas as described above which causes the first end 62 of the lever 54 to move away from the cartridge 42. This movement causes in turn the second end 64 of the lever 54 to release the flag 60 and allow it to drop to the position shown in FIG. 8 and provide the desired signal that the surge arrester 12 has been faulted. The illustrated embodiment relies on gravity to cause movement of the flag 60, but if it were desired to mount the fault indicator in another position, a spring could be provided at the hinge 58 to cause the desired movement of the flag 60.

Thus there has been described fault indicators 10 and 50 which accomplish the goals set forth above. Many variations in its construction will be apparent to those skilled in the art. For example, the shield 14 could be a single piece of longitudinally slit tubing, with its slit ends overlapping to cover the fault indicator 10. In this case, the shield 14 could be retained on the fault indicator 10 by only a single plug 16 and the gas vent passageway 20 need only extend to this single plug 16. As other alternatives, the shield 14 could be comprised of more than two pieces or each shield 14 piece could be retained by more than one plug 16 in which case gas passageways 20 would be provided for each plug 16. In still other alternatives, the pressure created by the cartridge 42 when the surge arrester 12 is faulted could be utilized to provide other indications of the condition. For example, streamers could be stuffed into the passageway 20 and blown out to indicate a fault or a switch could be activated which would actuate a noise maker in a battery-powered circuit.

I claim

1. A fault indicator for indicating a fault condition of a surge arrester comprising:

a first conductive indicator half including an exterior surface, means on said exterior surface for mounting said first indicator half in series electrically with the surge arrester and means for focussing an electrical arc created by an overvoltage in the fault indicator;

a second conductive indicator half including an exterior surface, means on said exterior surface for mounting said second indicator half in series electrically with the surge arrester and means for producing pressurized gas in response to the application of heat created by said electrical arc;

said first and said second indicator halves being aligned so that said electrical arc is focussed on said means for producing pressurized gas;

a gas vent passageway extending from said means for producing pressurized gas in a direction away from said first indicator half, said passageway extending to and communicating with said exterior of said second indicator half;

means disposed in said gas vent passageway and responsive to said pressurized gas for producing a signal that said electrical arc has been created and said pressurized gas has been produced.

2. A fault indicator according to claim 1 wherein said means for focussing said electrical arc comprises a protrusion extending from said first indicator half in alignment with said means for producing gas.

3. A fault indicator according to claim 2 wherein said protrusion is a frusto-conical in shape.

4. A fault indicator according to claim 1 wherein said means for producing gas is a conductive container enclosing a combustible material.

5. A fault indicator according to claim 4 wherein said conductive container is a blank firearm cartridge.

6. A fault indicator according to claim 1 further including means connecting said first and said second indicator halves for permitting the flow of a leakage electrical current between said indicator halves.

7. A fault indicator according to claim 6 wherein said means for permitting the flow of a leakage electrical current is a resistor connected between said first and said second indicator halves.

8. A fault indicator according to claim 1 wherein said means for producing a signal that said pressurized gas has been produced is a shield covering at least a portion of said second indicator half and a plug extending into said gas vent passageway and retaining said shield relative to said second indicator half, wherein the production of pressurized gas expels said plug from said passageway and thereby removes said shield from said second indicator half.

9. A fault indicator according to claim 1 wherein said means for producing a signal that said pressurized gas has been produced is a flag pivotally mounted to said fault indicator and a lever mounted on said second indicator half and having a first end closing said gas vent passageway when said lever is in a first position and a second end restraining said flag when said lever is in said first position, said lever being movable to a second position in response to said production of said pressurized gas wherein said flag is released by said lever second end to provide said signal that said pressurized gas has been produced.

10. A fault indicator for indicating a fault condition of a surge arrester comprising:

a first conductive indicator half including an exterior surface, means on said exterior surface for mounting said first indicator half in series electrically with the surge arrester and a protrusion for focussing an electrical arc;

a second conductive indicator half including an exterior surface, means on said exterior surface for mounting said second indicator half in series electrically with the surge arrester and a conductive cartridge for producing gas in response to the application of heat to said cartridge;

said first and said second indicator halves being aligned so that said electrical arc is focussed on said cartridge;

an electrical resistor connecting said first and said second indicator halves to permit the flow of a leakage electrical current between said indicator halves;

a gas vent passageway extending from said explosive cartridge in a direction away from said first indicator half, said passageway extending to and communicating with said exterior of said second indicator half;

a shield covering at least a portion of said second indicator half;

a plug extending into said gas vent passageway and retaining said shield relative to said second indicator half;

said cartridge being responsive to the creation of said electrical arc such that when heated by said arc said cartridge explosively creates gas at a pressure and with a volume sufficient to expel said plug from said passageway and thereby remove said shield from said second indicator half to provide a visual indication that said cartridge has exploded.

* * * * *